March 30, 1937.  O. A. HANSEN  2,075,579

OPERATING MECHANISM FOR MOTOR VEHICLE CLUTCHES AND THE LIKE

Filed May 5, 1930

INVENTOR
O. ARNOLD HANSEN

BY *Richey & Watts*

ATTORNEYS

Patented Mar. 30, 1937

2,075,579

UNITED STATES PATENT OFFICE 2,075,579

OPERATING MECHANISM FOR MOTOR VEHICLE CLUTCHES AND THE LIKE

Odd Arnold Hansen, Buffalo, N. Y., assignor to The White Motor Company, a corporation of Ohio Application May 5, 1930, Serial No. 449,814

6 Claims. (Cl. 192—85)

This invention relates to clutch actuating mechanisms, and more particularly to means for applying a variable force to a motor vehicle clutch.

One object of this invention is to press the members of a motor vehicle clutch together with a force varying in part with the torque on said clutch to insure the transmission of power and facilitate manipulation of the clutch.

Other objects are to exert on a motor vehicle clutch a varying force derived from the engine, and to provide means for exerting such force which are simple to construct and install and wholly automatic in operation.

Other objects relating to details of construction and economies of manufacture will appear hereinafter.

In the accompanying drawing, which illustrates a preferred embodiment of the invention:

Figure 1:
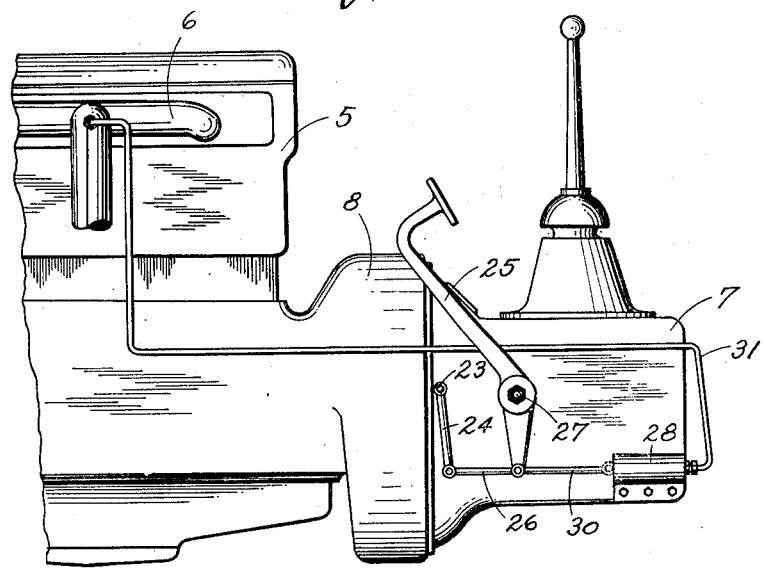
Fig. 1 is a side elevation of a portion of a motor vehicle internal combustion engine and transmission, illustrating the application of this invention.
Figure 2:
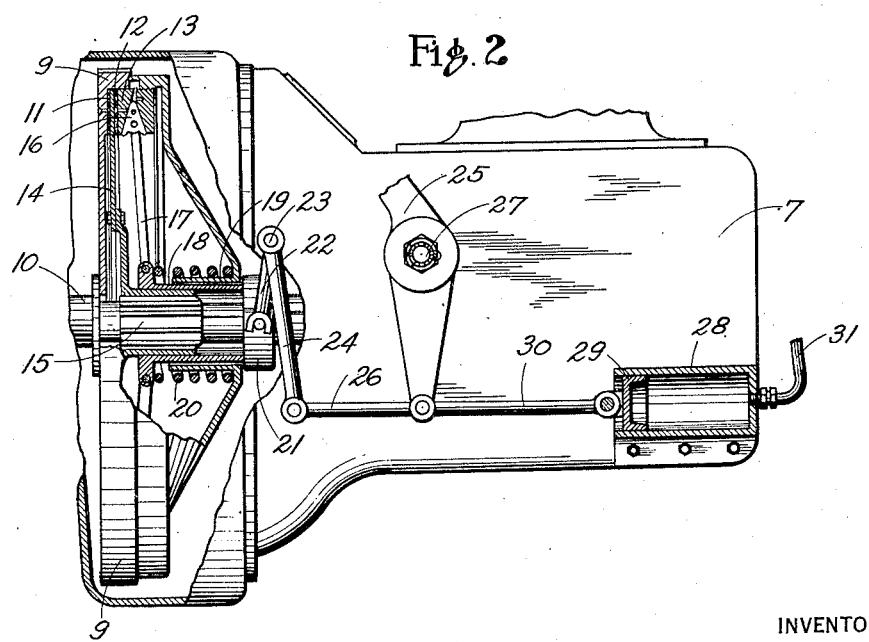
Fig. 2 is a view similar to Fig. 1 on an enlarged scale, parts being broken away to show the construction.

Referring to the drawing the numeral 5 designates an internal combustion engine having an intake manifold 6. A change speed transmission enclosed within the housing 7 is coupled to the engine by a clutch of any suitable type enclosed within the housing 8. The clutch illustrated herein is mounted within a flywheel 9 fixed to the engine shaft 10 and carrying a friction lining 11. A friction lining 12 carried by a movable ring 13 cooperates with the lining 11 to grip therebetween a clutch plate 14 splined to a driven shaft 15. Wedges 16 are arranged to force the ring 13 toward the lining 11, and are carried by links 17 pivoted to a sleeve 18 splined within an inturned flange 19 of the flywheel. A spring 20 normally maintains the links 17 extended and the clutch plate 14 firmly engaged by the linings 11 and 12.

A releasing collar 21 bears on the end of the sleeve 18 and is operable to move the same against the tension of the spring 20 to retract the links 17 and release the clutch. A yoke 22 fixed to a shaft 23 journalled in the casing 7 is engaged with the collar 21 for actuating the same. An arm 24 fixed to the shaft 23 is connected to the clutch lever 25 by a link 26. The clutch lever 25 is pivoted to any convenient supporting element, as indicated at 27.

A fluid pressure cylinder 28 having a piston 29 slidable therein is bolted to the casing 7 or otherwise suitably supported. The piston 29 carries a link 30, which is pivoted to the lower end of the lever 25 conjointly with link 26. The interior of the cylinder 28 is in constant communication with the interior of the intake manifold 6 through a conduit 31.

It will be evident that the resultant force maintaining the clutch members in engagement is equal to the force of the spring 20 less the force on the piston 29. When the power of the engine is being transmitted by the clutch, the depression in the intake manifold varies roughly in inverse proportion to the torque. Accordingly, as the torque approaches its maximum, the force of the piston 29 approaches its minimum, and substantially all of the force of the spring 20 acts to maintain the clutch engaged.

When an internal combustion engine is being operated on an automotive vehicle during conditions most frequently obtaining, which is to say, under conditions arising in normal operation and to be distinguished from what may be termed abnormal or temporary conditions, for instance, while commencing descent of a hill when the momentum of the vehicle helps or when commencing an ascent—the fluid pressure means which is operable in response to pressure differences on opposite sides of the throttle valve and which is also responsive to the changes in useful torque conditions or to changes in the useful range of developed torque to cause a varying closing force on the clutch, varying roughly or approximately throughout the entire range of torque transmission by said clutch in direct proportion to the torque transmitted and yet being sufficient under all conditions arising during normal operation to prevent slipping of said clutch while the fluid pressure means tends to cause slipping of the clutch against the dominant action of the clutch spring.

However, when the engine is used as a brake to retard the speed of the vehicle on a grade, the depression in the intake manifold varies to some extent in direct proportion to the torque on the clutch. Under these conditions, therefore, the depression in the intake manifold approaches its maximum as the torque on the clutch approaches its maximum.

It is found, however, that the torque taken by the clutch when the engine is used as a brake is at all times substantially less than the torque to which the clutch may be subjected when the power of the engine is being transmitted thereby. Accordingly, the diameter of the cylinder 28 and the strength of the spring 20 are coordinated in such a manner that the force applied to the clutch by the piston 29 is insufficient to cause the clutch to slip when the engine is used as a brake on a down grade.

When the power of the engine is then applied to the clutch, the force of the piston 29 decreases, since the depression in the intake manifold decreases, and the resultant force holding the clutch members in engagement increases sufficiently to carry the increased torque without slipping. As a result, the clutch is held in engagement with sufficient force to prevent slipping under any conditions arising in normal operation.

It has been found in some instances that proper coordination is obtained by making the cylinder 28 of such size as to overcome about half of the force of the spring 20 during maximum intake manifold depression. This ratio, however, varies according to the characteristics of the particular engine and clutch to which the invention is applied.

In the operation of a motor vehicle, the throttle valve is ordinarily substantially closed when the clutch is released. It will be evident, therefore, that the force which the operator must exert on the clutch pedal 25 to open the clutch is considerably less than would be necessary to overcome the entire force of the spring 20, since the intake manifold depression is relatively high when the throttle valve is substantially closed. The effort required to operate the clutch is therefore reduced, but not sufficiently to cause the clutch to slip during normal operation of the vehicle.

While the foregoing description is necessarily of a detailed character in order that the invention may be fully set forth, it is to be understood that various modifications, substitutions, and rearrangements of parts may be resorted to without departing from the scope of the invention as defined in the following claims.

I claim:

1. In a motor vehicle, the combination of a motor, a clutch, and means constantly responsive to changes in torque conditions for exerting a varying closing force on said clutch varying roughly throughout the entire range of torque transmission by said clutch in direct proportion to the torque transmitted, and being sufficient under all conditions arising in normal operation to prevent slipping of said clutch.

2. In a motor vehicle, the combination with a motor and a spring-closed clutch, of means operated by the motor for constantly exerting a varying opening force on said clutch tending, but not sufficient, to open said clutch.

3. In a motor vehicle, the combination with a motor and a spring-closed clutch, of means for constantly exerting on said clutch a force derived from said motor tending, but not sufficient, to open said clutch.

4. The combination in a motor vehicle, of an internal combustion engine having an intake manifold, a spring-closed clutch for transmitting the power of said engine, manually operated means for releasing said clutch, and fluid pressure means in communication with said intake manifold and actuated by the difference in atmospheric pressure and the pressures created within said intake manifold constantly tending to release said clutch during operation of said engine, but being incapable of exerting a sufficient force to cause said clutch to slip under any torque condition arising in normal operation.

5. The combination in a motor vehicle, of an internal combustion engine having an intake manifold, a spring-closed clutch for transmitting the power of said engine, and fluid pressure means including a member subjected on one side to atmospheric pressure and on its other side to the pressures created within said intake manifold constantly tending to release said clutch during operation of the engine, but being incapable of exerting a sufficient force to cause said clutch to slip under any torque condition arising in normal operation.

6. In a motor vehicle, the combination of a motor having a throttle valve, a clutch, a clutch spring, fluid pressure means operable in response to pressure differences in opposite sides of the throttle valve and responsive to changes in the useful range of developed torque for causing a varying clutch-closing force to be exerted by said clutch spring, said closing force varying approximately throughout the entire range of torque transmission by said clutch in direct proportion to the torque transmitted and yet sufficient under all conditions arising during normal operation to prevent slipping of said clutch.

O. ARNOLD HANSEN.